(12) United States Patent
Kozak et al.

(10) Patent No.: US 9,426,453 B2
(45) Date of Patent: Aug. 23, 2016

(54) METHODS AND APPARATUS FOR 3D SHUTTER GLASSES SYNCHRONIZATION

(75) Inventors: Eric Kozak, Burnaby (CA); Neil W. Messmer, Langley (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 661 days.

(21) Appl. No.: 13/411,161

(22) Filed: Mar. 2, 2012

(65) Prior Publication Data

US 2012/0224039 A1 Sep. 6, 2012

Related U.S. Application Data

(60) Provisional application No. 61/449,553, filed on Mar. 4, 2011.

(51) Int. Cl.
*H04N 13/04* (2006.01)
*G02B 27/22* (2006.01)

(52) U.S. Cl.
CPC ........ *H04N 13/0438* (2013.01); *G02B 27/2264* (2013.01); *H04N 13/0497* (2013.01); *H04N 2213/008* (2013.01)

(58) Field of Classification Search
CPC ........... G02B 27/2264; H04N 13/0497; H04N 13/0438; H04N 2213/008
USPC .................................................. 348/56, 55
See application file for complete search history.

(56) References Cited

U.S. PATENT DOCUMENTS

| | | | | |
|---|---|---|---|---|
| 5,245,319 | A * | 9/1993 | Kilian | 345/9 |
| 5,572,250 | A | 11/1996 | Lipton | |
| 5,821,989 | A * | 10/1998 | Lazzaro et al. | 348/56 |
| 6,008,484 | A * | 12/1999 | Woodgate et al. | 250/201.1 |
| 6,678,091 | B2 * | 1/2004 | Tropper | 359/462 |
| 6,791,599 | B1 * | 9/2004 | Okada et al. | 348/56 |
| 8,482,596 | B2 * | 7/2013 | Chen et al. | 348/42 |
| 8,605,071 | B2 * | 12/2013 | Chen et al. | 345/211 |
| 2001/0043266 | A1 * | 11/2001 | Robinson et al. | 348/53 |
| 2007/0075920 | A1 | 4/2007 | Charlesworth | |
| 2007/0229951 | A1 | 10/2007 | Jung | |
| 2009/0051759 | A1 | 2/2009 | Adkins | |
| 2009/0109282 | A1 * | 4/2009 | Schnebly et al. | 348/55 |
| 2009/0201362 | A1 | 8/2009 | Shestak et al. | |
| 2009/0237327 | A1 * | 9/2009 | Park et al. | 345/8 |
| 2010/0253678 | A1 * | 10/2010 | Choi | H04N 13/0454 345/419 |
| 2010/0289755 | A1 * | 11/2010 | Zhu | G06F 3/042 345/173 |
| 2010/0302352 | A1 * | 12/2010 | Jacek | 348/56 |
| 2011/0187837 | A1 * | 8/2011 | Price | 348/53 |
| 2011/0205345 | A1 * | 8/2011 | Choi et al. | 348/56 |
| 2011/0216161 | A1 * | 9/2011 | Sato | 348/43 |
| 2011/0228061 | A1 * | 9/2011 | Price | 348/56 |

(Continued)

FOREIGN PATENT DOCUMENTS

JP 363002497 A * 1/1988
JP 2009-230071 10/2009

(Continued)

*Primary Examiner* — David Harvey

(57) ABSTRACT

Methods and apparatus for signaling timing of refreshes of stereographic displays are provided. In some embodiments, light emitting elements are used to signal the start of a display refresh and to signal when the light emitting elements of the display have attained a stable optical state following the display refresh. In some embodiments, light emitting elements used to signal timing of display refreshes include light emitting elements defining a display area of the display.

19 Claims, 8 Drawing Sheets

(56) References Cited

U.S. PATENT DOCUMENTS

| | | | |
|---|---|---|---|
| 2011/0234774 A1* | 9/2011 | Satoh et al. | 348/56 |
| 2011/0234777 A1* | 9/2011 | Kobayashi et al. | 348/56 |
| 2011/0285833 A1* | 11/2011 | Tsurumoto et al. | 348/56 |
| 2011/0316850 A1* | 12/2011 | Chen | 345/419 |
| 2012/0002122 A1* | 1/2012 | Lin | 349/15 |
| 2012/0007968 A1* | 1/2012 | Shintani | H04N 13/0497 348/56 |
| 2012/0013614 A1* | 1/2012 | Matsuhiro et al. | 345/419 |
| 2012/0050266 A1* | 3/2012 | MacNaughton et al. | 345/419 |
| 2012/0224039 A1* | 9/2012 | Kozak et al. | 348/56 |
| 2013/0002835 A1* | 1/2013 | Winer | 348/56 |

FOREIGN PATENT DOCUMENTS

| | | |
|---|---|---|
| KR | 2008-055081 | 6/2008 |
| WO | 9838803 | 9/1998 |
| WO | 20090069026 | 6/2009 |

\* cited by examiner

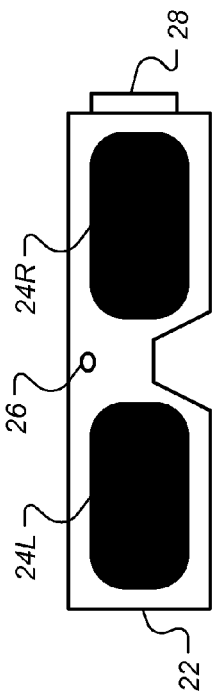
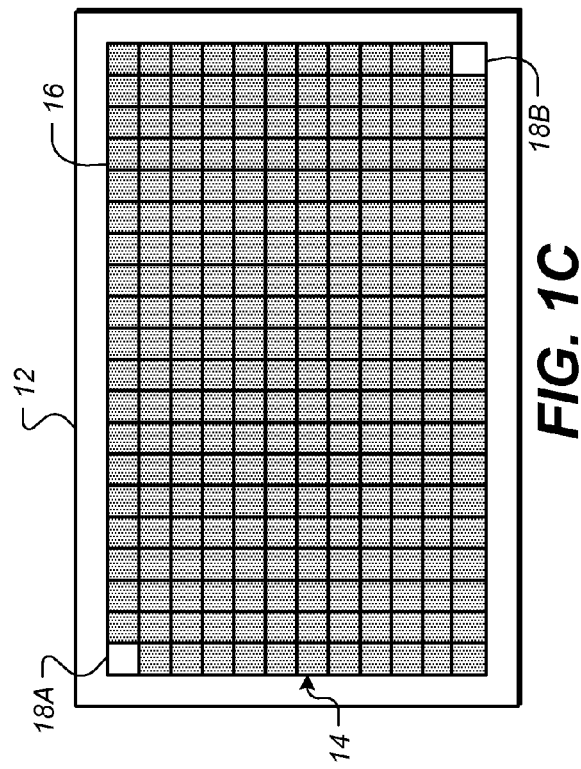
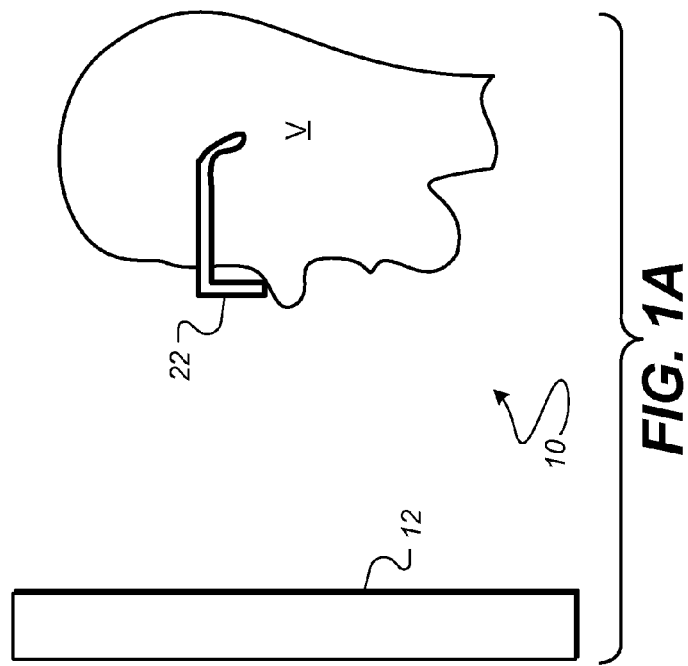

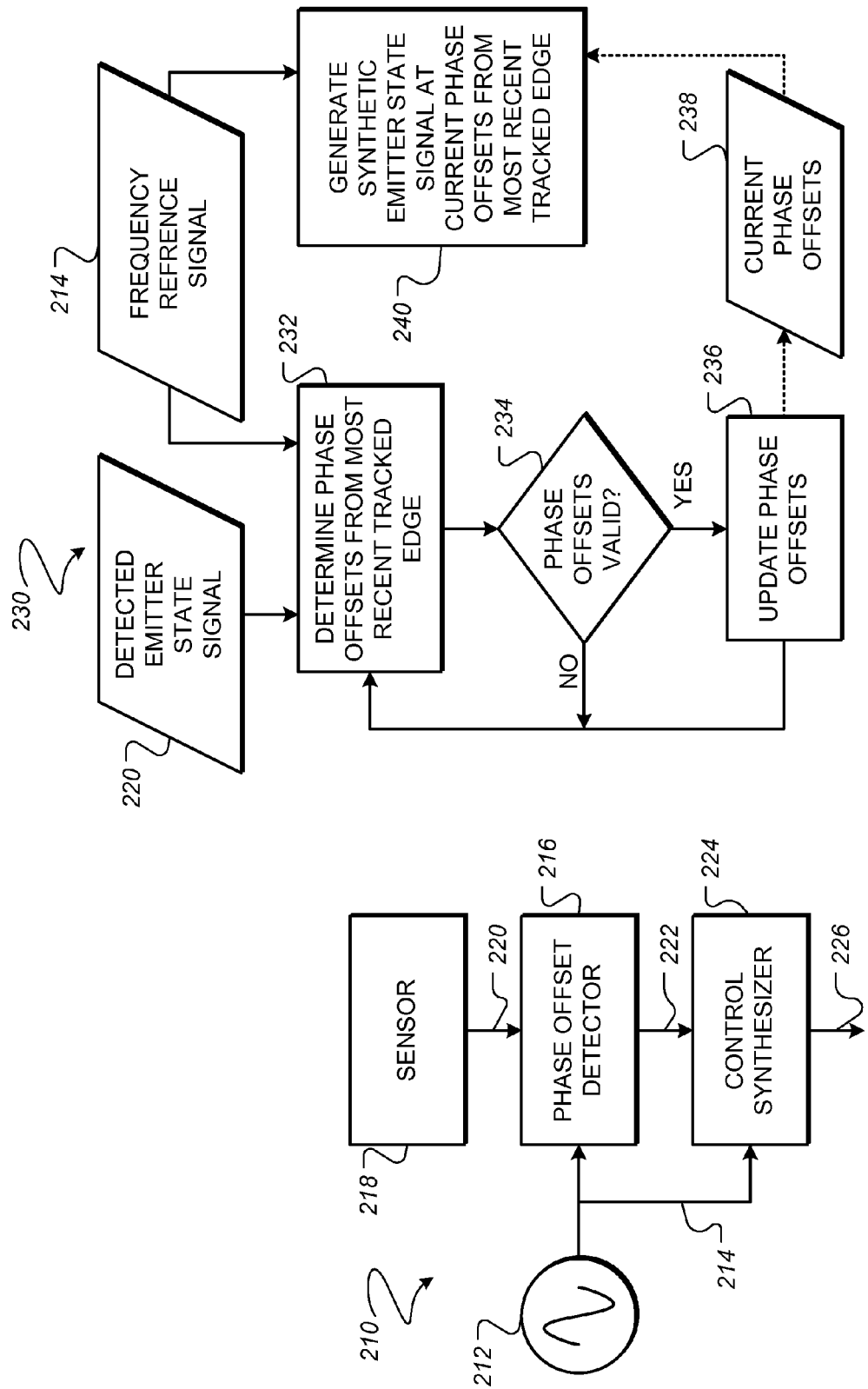

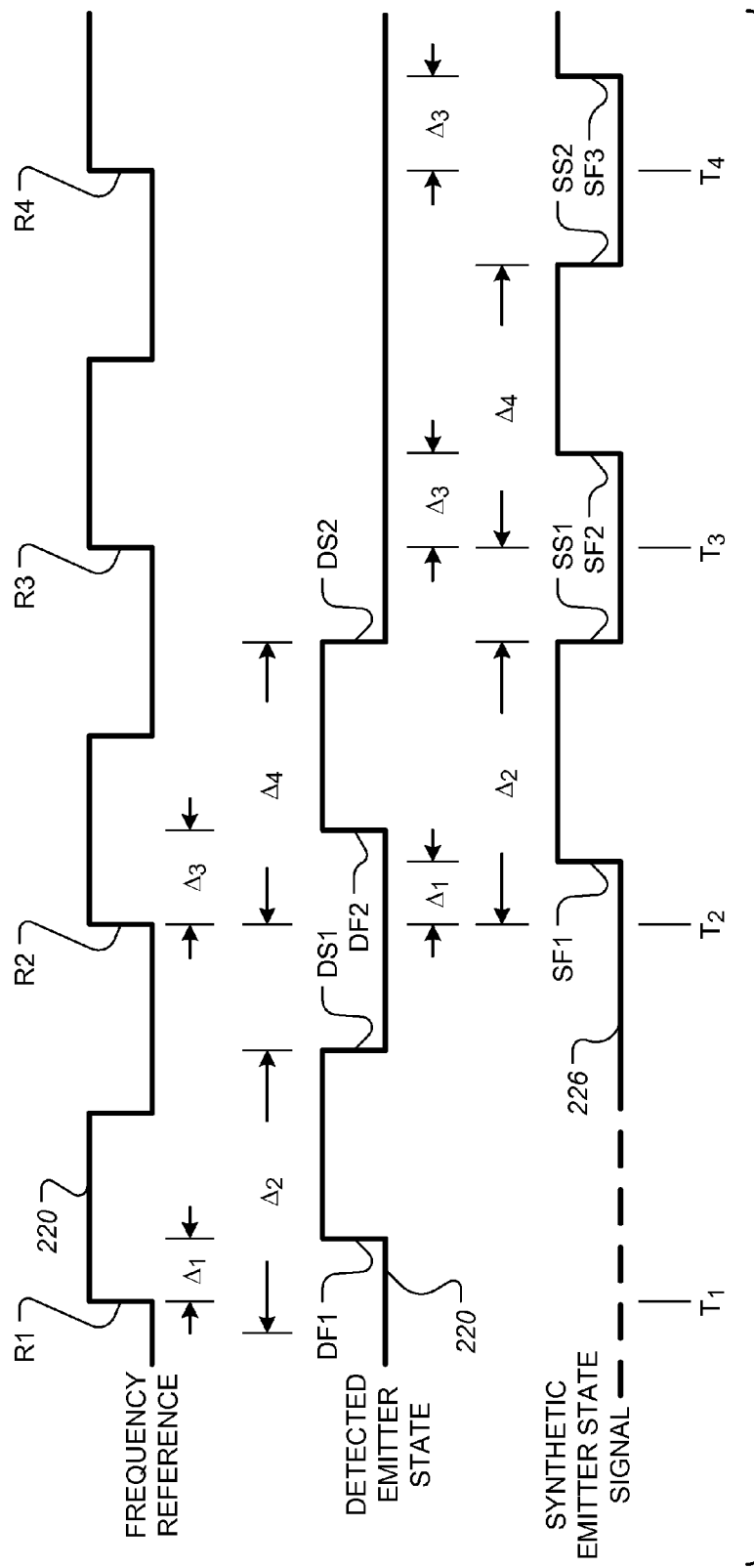

METHODS AND APPARATUS FOR 3D SHUTTER GLASSES SYNCHRONIZATION

CROSS-REFERENCE TO RELATED APPLICATIONS

This application claims priority to U.S. Provisional Patent Application No. 61/449,553 filed 4 Mar. 2011, which is incorporated herein by reference in its entirety.

TECHNICAL FIELD

The application relates to 3D displays, particularly displays of the type which use shutter glasses for presenting stereographic images. Embodiments provide methods and apparatus for signaling timing of display refreshes to shutter glasses.

BACKGROUND

Stereographic three dimensional (3D) display systems create the illusion of depth by displaying different flat images to each of viewers' left and right eyes. Some 3D display systems alternately display left eye and right eye images (e.g., by alternate-frame sequencing) on the same display. Shutter glasses worn by viewers are synchronized with the display to pass light to each eye only during the interval in which the corresponding image is displayed.

In order that each eye sees only the image intended for it, shutter glasses must be synchronized with the images displayed. If shutter glasses are out of synchronization with the display, undesirable visual artifacts (e.g., a horizontal band of blurriness, often at the top of the display) may result. Shutter glasses may be out of synchronization with the display due to variations in display panels, fabrication of shutter glasses, or operating conditions, among other reasons.

Accordingly, there is need for methods and apparatus providing improved synchronization of shutter glasses with the display of such images.

BRIEF DESCRIPTION OF THE DRAWINGS

The accompanying simplified drawings illustrate non-limiting example embodiments.

FIG. 1A is a schematic side elevation view of a system for operating shutter glasses to block light from a display while the display is being refreshed according to an example embodiment.

FIG. 1B is a schematic front elevation view of shutter glasses according to an example embodiment.

FIG. 1C is a schematic front elevation view of a display according to an example embodiment.

FIG. 7A is a block diagram of a system according to an example embodiment for generating a synthetic emitter state signal.

FIG. 7B is a flowchart of a method according to an example embodiment for generating a synthetic emitter state signal.

FIG. 7C is a timing diagram of method according to an example embodiment generating a synthetic emitter state signal.

SUMMARY OF THE INVENTION

Figure 2:
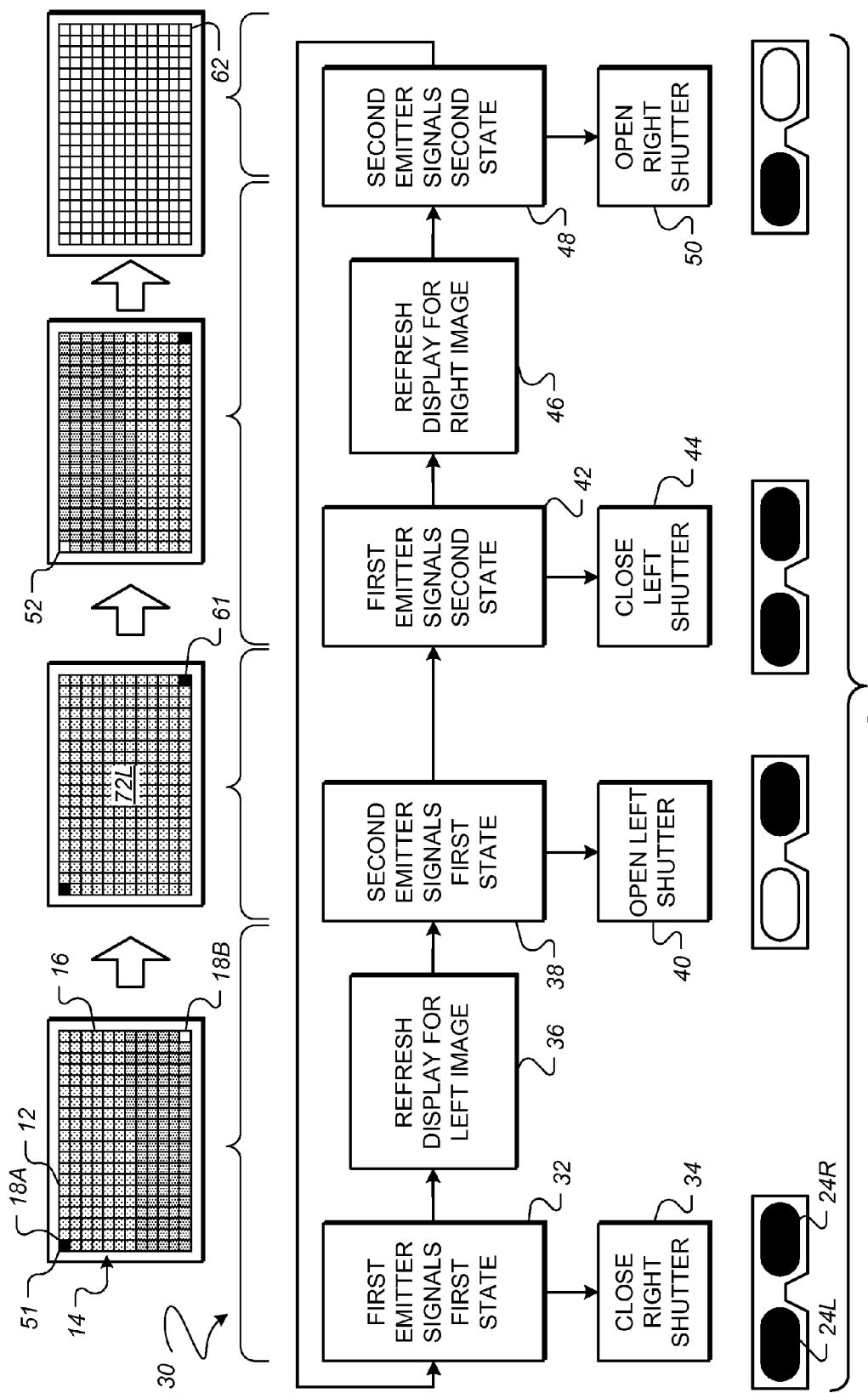
FIG. 2 is a schematic diagram illustrating a method according to an example embodiment for operating shutter glasses to block light from a display while the display is being refreshed.

An aspect of the invention provides a method for generating a signal to synchronize 3D glasses comprising driving a spatial light modulator to display a sequence of images, the images comprising left images and right images, between display of left and right images, refreshing the spatial light modulator, the refreshing comprising, in a sequence, changing driving signals for a plurality of parts of the spatial light modulator starting with a first-to-be-updated part and completing with a last-to-be-updated part, and controlling transmission of a synchronization signal at least in part by the driving signals for the last-to-be-updated part. Some embodiments according to this aspect comprise transmitting the synchronization signal by way of the last-to-be-updated part of the spatial light modulator. In some embodiments according to this aspect, the last-to-be-updated part of the spatial light modulator comprises a last-to-be-updated pixel of the spatial light modulator. In some embodiments according to this aspect, the synchronization signal comprises electromagnetic radiation at a frequency not included in the spectrum of light over which the left and right images are displayed. In some embodiments according to this aspect, the synchronization signal is imperceptible to the human visual system.

Another aspect of the invention provides a method for generating a signal to synchronize 3D glasses comprising, in refreshing a display to display a new image, applying updated driving signals to light emitting elements of the display according to a sequence having a first portion and a last portion, and controlling transmission of a synchronization signal at least in part by the updated driving signals applied in the last portion of the sequence. In some embodiments according to this aspect, controlling transmission of the synchronization signal comprises changing the amount of electromagnetic radiation emitted by at least one light emitting element in a last-to-be-updated part of the display. In some embodiments according to this aspect, the at least one light emitting element in the last-to-be-updated part of the display comprises a spatial light modulator pixel. In some embodiments according to this aspect, the synchronization signal comprises electromagnetic radiation at a frequency not included in the spectrum of light over which the left and right images are displayed. In some embodiments according to this aspect, the synchronization signal is imperceptible to the human visual system.

A further aspect of the invention provides a 3D display comprising a spatial light modulator, a light source configured to illuminate the spatial light modulator, a display controller configured to: drive the spatial light modulator to display a sequence of images, the images comprising left images and right images, and, between display of left and right images refresh the spatial light modulator, the refresh comprising, in a sequence, changing driving signals for a plurality of parts of the spatial light modulator starting with a first-to-be-updated part and completing with a last-to-be-updated part, and a signal source configured to emit electromagnetic radiation onto the last-to-be-updated part of the spatial light modulator, the electromagnetic radiation emittable by the signal source comprising electromagnetic radiation at a frequency not included in the spectrum of light emittable by the light source onto the spatial light modulator. In some embodiments according to this aspect, the electromagnetic radiation emittable by the signal source is imperceptible to the human visual system (e.g., the electromagnetic radiation emittable by the signal source comprises radiation in the infrared spectrum).

Yet another aspect of the invention provides a 3D display comprising a spatial light modulator, a light source configured to illuminate the spatial light modulator, a display controller configured to: in refreshing the display to display a new image, apply updated driving signals to pixels of the spatial light modulator according to a sequence having a first portion and a last portion, and a signal source configured to emit electromagnetic radiation onto a pixel updated in the last portion of the sequence, the electromagnetic radiation emittable by the signal source distinct from the spectrum of light emittable by the light source onto the spatial light modulator. In some embodiments according to this aspect, the electromagnetic radiation emittable by the signal source is imperceptible to the human visual system (e.g., the electromagnetic radiation emittable by the signal source comprises radiation in the infrared spectrum).

Still another aspect of the invention provides a method for synchronizing 3D glasses comprising displaying left images and right images in alternation on a display comprising a spatial light modulator, between displaying the left image and right images, updating a plurality of parts of the spatial light modulator according to a sequence, transmitting a synchronization signal to a viewing area by way of a last-to-be-updated one of the parts of the spatial light modulator, and synchronizing the 3D glasses in response to detecting the synchronization signal in the viewing area.

Yet a further aspect of the invention provides a method for transmitting synchronization information to apparatus for viewing a 3D display, the method comprising displaying left- and right-eye images on a display comprising a spatial light modulator, and generating a synchronization signal by controlling selected controllable elements of the spatial light modulator to modulate electromagnetic radiation from an electromagnetic radiation source configured to emit electromagnetic radiation onto the selected controllable elements of the spatial light modulator. Some embodiments comprise refreshing the spatial light modulator such that different parts of the spatial light modulator are refreshed in a sequence wherein the method comprises refreshing the selected controllable elements at an end of the sequence.

Still a further aspect of the invention provides a 3D display system comprising a display and a shutter assembly comprising first and second shutters operable to selectively block light to a viewer's left eye, right eye, or both eyes, wherein the display comprises a spatial light modulator, a source of invisible light illuminating a portion of the spatial light modulator, and a controller configured to generate a synchronization signal by controlling transmission of the invisible light to the shutter assembly by way of one or more controllable elements in the portion of the spatial light modulator, and wherein the shutter assembly comprises a sensor configured to detect the synchronization signal and a controller configured to control a timing of the operation of the first and second shutters in response to the synchronization signal.

Some aspects of the invention provide shutter glasses. One such aspect provides shutter glasses comprising left and right shutters independently operable to selectively block visible light, a sensor configured to detect a synchronization signal, and a controller configured to, in response to the sensor detecting the synchronization signal indicative of a first state, control the left shutter to be open, in response to the sensor detecting the synchronization signal indicative of a second state, control the right shutter to be open, and, in response to the sensor detecting the synchronization signal indicative of a third state, control the left and right shutters to be open.

Another such aspect provides shutter glasses comprising left and right shutters independently operable to selectively block visible light, a sensor configured to detect and distinguish between first electromagnetic radiation and second electromagnetic radiation, the first electromagnetic radiation including a frequency not included in the second electromagnetic radiation, and a controller configured to operate the left and right shutters based on the detection of the first electromagnetic radiation and the second electromagnetic radiation by the sensor. In some embodiments according to this aspect, the first and second electromagnetic radiation includes electromagnetic radiation imperceptible to the human visual system (e.g., the first and second electromagnetic radiation may include electromagnetic radiation in the infrared spectrum).

A further such aspect provides shutter glasses comprising left and right shutters independently operable to selectively block visible light, a sensor configured to detect and distinguish between at least three different power levels of signaling electromagnetic radiation, and a controller configured to operate the left and right shutters based on the power level of the signaling electromagnetic radiation detected by the sensor. In some embodiments according to this aspect, the signaling electromagnetic radiation includes electromagnetic radiation imperceptible to the human visual system (e.g., the signaling electromagnetic radiation may include electromagnetic radiation in the infrared spectrum).

A further aspect of the invention provides a method for producing from input video data including frames specifying left and right eye images output video data configured to drive a spatial light modulator to produce a synchronization signal, the method comprising, for frames specifying ones of the left and right eye images, setting an image data value of the output video data corresponding to at least one light emitting element of a last-to-be-updated part of the spatial light modulator such that the at least one light emitting element emits electromagnetic radiation when driven according to the value, and, for frames specifying others of the left and right eye images, setting the image data value of the output video data corresponding to the at least one light emitting element such that the at least one light emitting element does not emit electromagnetic radiation when driven according to the value.

DESCRIPTION OF THE INVENTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

In some displays, the refreshing of displayed images may result in visual artifacts that may be perceived as undesirable by viewers. For example some displays (e.g., LCD panels) refresh the images displayed thereon by updating pixels according to a raster scan pattern (e.g., pixel-by-pixel, left-to-right, top-to-bottom sequentially). Further, changes in pixel characteristics do not occur instantaneously when a display is updated. These issues may lead to blurring. In 3D display systems which use alternate-frame sequencing, the time required for refreshing a display may lead to crosstalk between left and right images. For another example, light modulating elements of some displays (e.g., LCD pixels) may overshoot the desired output level when their driving signals are changed and oscillate about the desired level before settling to the correct level, leading to an undesirable visual characteristic known as "inverse ghosting".

In 3D display systems comprising shutter glasses, the perception of visual artifacts resulting from the refresh of displayed images may be mitigated by operating the shutter glasses to block light during the entire interval that a display is being refreshed. However, in order to achieve such mitigation, the operation of the shutter glasses must reliably block light during the refresh interval.

Reliably blocking light during the refresh interval can be problematic because the time delay between the initiation a display refresh at a display driver and the change in the visual appearance of the display may vary and may be unknown. For example, where shutter glasses are synchronized to the display refresh rate, light may not be reliably blocked during the refresh interval due to an unknown time offset between the refresh rate signal and the start of the refresh interval. Reliably blocking light during the refresh interval can also be problematic because the time required to completely refresh the display and for the display to settle may vary and may be unknown. For example, where shutter glasses are synchronized to the display refresh rate, light may not be reliably blocked during the refresh interval due to an unknown time offset between the refresh rate signal and the end of the refresh interval.

One potential solution to the problem of reliably blocking light during the refresh interval is to extend the time interval that the shutter glasses block light sufficiently to guarantee that light is blocked for at least the entire refresh interval. Extending the time that the shutter glasses block light provides a margin for synchronization error. A disadvantage of this solution is that it reduces the proportion of time that light is permitted to pass to viewers' eyes, which may result in a lower perceived brightness.

In some embodiments, a 3D viewing system includes elements that directly detect completion of a refresh cycle and control shutter glasses in response to detected completion of refresh cycles.

FIG. 1A is a schematic side elevation view of an example system 10 for operating shutter glasses 22 to block light from a display 12 while display 12 is being refreshed according to an example embodiment. System 10 comprises a display 12 and shutter glasses 22. Shutter glasses 22 are worn by a viewer V. When viewer V is looking at display 12, glasses 22 face toward display 12.

FIG. 1B is a schematic front elevation view of shutter glasses 22. Shutter glasses 22 comprise left and right shutters 24L and 24R. Shutters 24L and 24R are independently operable to block or pass light. Shutter glasses 22 also comprise a sensor 26. Sensor 26 is substantially forward facing. When glasses 22 are worn by viewer V, sensor 26 faces substantially the same direction as viewer V. Shutter glasses 22 comprise a controller 28 that is coupled to sensor 26 and shutters 24L and 24R.

FIG. 1C is a schematic front elevation view of display 12. Display 12 comprises a pixel grid of light emitting elements 14 which define a display area 16. Light emitting elements 14 are controlled to emit light that forms an image over display area 16. Display 12 comprises at least first and second emitters 18A and 18B. Emitters 18A and 18B are shown located near the top left and bottom right corners, respectively, of display area 16. In other embodiments, emitters 18A and 18B may be located elsewhere on display 12 (e.g., outside of display area 16, adjacent one another, etc.).

Emitters 18A and 18B are each independently operable. Emitters 18A and 18B can be controlled to emit different signals. Emitters 18A and 18B, and sensor 26 are configured such that sensor 26 can detect and distinguish between signals from emitters 18A and 18B. Sensor 26 may comprise a single sensor. In alternative embodiments, sensor 26 may comprise two distinct sensing elements, such as distinct photodetectors having different spectral filters, for example. When sensor 26 detects signals from emitters 18A and 18B, it relays corresponding signals to controller 28 of glasses 22. Controller 28 of glasses 22 is configured to control shutters 24L and 24R based at least in part on the signals that controller 28 receives from sensor 26.

Emitters 18A and 18B are configured to emit their signals at least in a direction which light emitting elements 14 emit light. Emitters 18A and 18B may be configured to emit their signals across substantially the entire viewing angle of display 12. Since sensor 26 faces substantially the same direction as viewer V, sensor 26 may be located to receive signals emitted by emitters 18A and 18B when viewer V watches display 12.

FIG. 2 is a schematic diagram illustrating a method 30 according to an example embodiment for operating shutter glasses 22. Method 30 allows left and right images to be presented to left and right eyes, respectively, but blocks both eyes from seeing light from display 12 while display 12 is being refreshed. In this example, glasses 22 initially have left shutter 24L closed and right shutter 24R open (not shown).

In step 32, first emitter 18A signals first state signal 51. In step 34, sensor 26 detects first state signal 51 emitted by emitter 18A, and, in response, controller 28 of glasses 22 closes right shutter 24R. Both right shutter 24R and left shutter 24L are now closed.

In step 36, display 12 is refreshed to show an image 72L intended for the left eye. Step 36 may comprise updating a plurality of parts of display 12 (e.g., light emitting elements 14 and/or groups of light emitting elements 14) according to a sequence having a first portion and a last portion. For example, step 36 may comprise changing driving signals for a plurality of parts of display 12 starting with a first-to-be-updated part and completing with a last-to-be-updated part. The sequence according to which parts of display 12 are updated may be pre-determined by the configuration of the means for controlling light emitting elements 14 (e.g., by the driving circuitry of display 12). In some embodiments, step 36 begins simultaneously with step 32.

At or about the time that the pixels of display 12 have attained a stable optical state that forms left-eye image 72L, second emitter 18B signals first state signal 61 in step 38. In some embodiments, step 38 occurs simultaneously with the end of step 36. For example, step 38 may occur during the last portion of the update sequence (e.g., simultaneous with changes to driving signals for the last-to-be-updated part of display 12). Sensor 26 detects first state signal 61 emitted by second emitter 18B, and, in response, controller 28 of glasses 22 opens left shutter 24L. Now left shutter 24L is open and right shutter 24R is closed. Viewer V can see left-eye image 72L with her left eye.

In step 42, first emitter 18A signals second state signal 52. In step 44, sensor 26 detects second state signal 52 emitted by emitter 18A, and, in response, controller 28 of glasses 22 closes left shutter 24L. Both right shutter 24R and left shutter 24L are now closed.

In step 46, display 12 is refreshed to show an image 72R intended for the right eye. Step 46 may comprise updating a plurality of parts of display 12 according to a sequence having a first portion and a last portion. For example, step 46 may comprise changing driving signals for a plurality of parts of display 12 starting with a first-to-be-updated part and completing with a last-to-be-updated part. The sequence according to which parts of display 12 are updated may be predetermined by the configuration of the means for controlling light emitting elements 14 (e.g., by the driving circuitry of display 12). In some embodiments, step 46 begins simultaneously with step 42.

At or about the time that the pixels of display 12 have attained a stable optical state that forms image 72R, second emitter 18B signals second state signal 62 in step 48. In some embodiments, step 48 occurs simultaneously with the end of step 46. For example, step 48 may occur during the last portion of the update sequence (e.g., simultaneous with changes to driving signals for the last-to-be-updated part of display 12). Sensor 26 detects second state signal 62 emitted by second emitter 18B, and, in response, controller 28 of glasses 22 opens right shutter 24R. Now left shutter 24L is closed and right shutter 24R is open. Viewer V can see right-eye image 72R with her right eye.

From the foregoing description, it will be appreciated that a display system controlled according to method 30 behaves according to the State Table I, below.

State Table I

| Display state | First emitter state | Second emitter state | Left shutter state | Right shutter state |
| --- | --- | --- | --- | --- |
| Left image stable | 0 | 0 | Open | Closed |
| Left image to right image transition | 1 | 0 | Closed | Closed |
| Right image stable | 1 | 1 | Closed | Open |
| Right image to left image transition | 0 | 1 | Closed | Closed |

It will be appreciated that methods according to other embodiments may use other state tables to signal display states for the operation of shutter glasses 22 to block light from display 12 while display 12 is being refreshed. For instance, State Table II, below, shows an example of another state table that may be used to signal display states.

State Table II

| Display state | First emitter state | Second emitter state | Left shutter state | Right shutter state |
| --- | --- | --- | --- | --- |
| Left image stable | 1 | 0 | Open | Closed |
| Left image to right image transition | 0 | 0 | Closed | Closed |
| Right image stable | 0 | 1 | Closed | Open |
| Right image to left image transition | 0 | 0 | Closed | Closed |

It will be appreciated that in systems with first and second emitters, State Table II leaves an unused state (1,1), which may be used to signal other information. For instance, state (1,1) may be used to indicate that an image suitable for simultaneous viewing by both eyes (e.g., a title screen, menu, freeze frame, or the like) is being displayed. In embodiments where an emitter state is used to indicate that an image suitable for simultaneous viewing by both eyes is being displayed, controller 28 of glasses 22 may be configured to open both left shutter 24L and right shutter 24R in response to that emitter state being detected.

State Table III, below, shows another example state table that may be used to signal display states.

State Table III

| Display state | First emitter state | Second emitter state | Left shutter state | Right shutter state |
| --- | --- | --- | --- | --- |
| Left image stable | 1 | 0 | Open | Closed |
| Left image to right image transition | 0 | 0 | Closed | Closed |
| Right image stable | 1 | 1 | Closed | Open |
| Right image to left image transition | 0 | 0 | Closed | Closed |

In some embodiments, emitters 18A and 18B are configured to emit steady state signals. For example, signal 51 may comprise emission of electromagnetic radiation of a first frequency (or spectrum of frequencies) at constant amplitude, signal 52 may comprise the absence of electromagnetic radiation of the first frequency (or spectrum of frequencies), signal 61 may comprise emission of electromagnetic radiation of a second frequency (or spectrum of frequencies) different from the first frequency (or spectrum of frequencies) at constant amplitude, and signal 62 may comprise the absence of electromagnetic radiation of the second frequency (or spectrum of frequencies). In some embodiments where emitters 18A and 18B are configured to emit steady state signals, controller 28 of glasses 22 may be configured to control the state of left and right shutters 24L and 24R based on the presence or absence of emissions from emitters 18A and 18B detected by sensor 26.

Emitters 18A and 18B may be configured to be controlled to signal their respective first and second state signals using the same means (e.g., driving circuitry, memory buffers, etc.) and/or signals (e.g., driving signals) used to control light emitting elements 14 of display 12. In some embodiments where the means and/or signals used to control light emitting elements 14 of display 12 are configured to update light emitting elements 14 of display 12 according to a sequence, emitters 18A and/or 18B may be controlled by those means as part of that sequence. For example, steps 32, 36 and 38 (likewise steps 42, 46 and 48) may be executed as parts of a pre-determined sequence defined by common driving means. In some embodiments, step 32 (or step 42) is executed in a first portion of such a sequence, and step 38 (or step 48) is executed in a last portion of such a sequence.

In some embodiments, emitters 18A and 18B comprise elements of substantially the same construction as light emitting elements 14 of display 12. For example, where display 12 comprises an LCD panel, emitters 18A and 18B may comprise LCD pixels of the same type as the LCD pixels of display 12. Advantageously, where emitters 18A and 18B comprise elements of substantially the same construction as light emitting elements 14 of display 12, the response characteristics of emitters 18A and 18B in changing states may be similar to the response characteristics of light emitting elements 14 when changing between values for left and right images during refreshing in steps 36 and 46.

In some embodiments, emitters 18A and 18B comprise light emitting elements 14 of display 12. For example, first emitter 18A may comprise one or more first-to-be-updated light emitting elements 14, thus making emitter 18A part of the first-to-be-updated part of display 12. For another example, second emitter 18B may comprise one or more last-to-be-updated light emitting elements 14, thus making emitter 18B part of the last-to-be-updated part of display 12.

Figure 3:
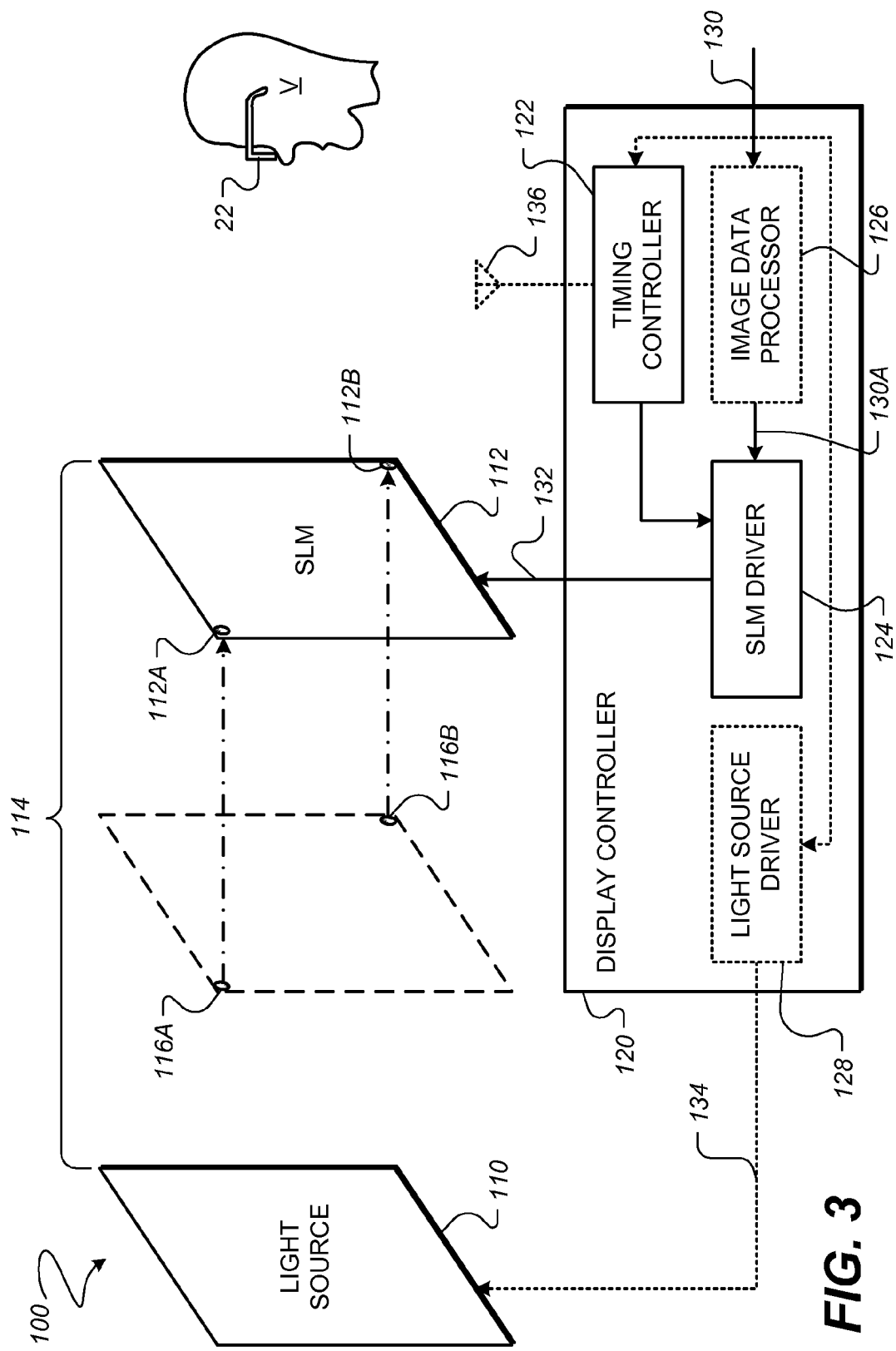
FIG. 3 is a schematic exploded perspective view of a dual modulator display according to an example embodiment.

FIG. 3 is a schematic exploded perspective view of a dual modulator display 100 according to an example embodiment.

Display 100 comprises a light source 110 and a spatial light modulator (SLM) 112. Light source 110 is operable to emit visible light. Light from light source 110 is delivered to SLM112 by way of an optical path 114.

Light source 110 may comprise one or more broad spectrum light sources (e.g., white cold cathode fluorescent lamps, white LEDs, etc.) or a plurality of narrower spectrum light sources (e.g., an array of red, green and blue LEDs, OLEDs, etc.). SLM 112 may comprise a transmission type SLM (e.g., a liquid crystal display (LCD) panel) or a reflective type SLM (e.g., a deformable minor device (DMD)). SLM 112 may be configured to be updated by raster scanning, for example.

Optical path 114 may comprise optical elements such as one or more lenses, mirrors, prisms, diffusers, collimators, optical cavities, light guides, free space transmission paths, combinations thereof, and the like. In a simple embodiment, light source 110 and spatial light modulator 112 are parallel and juxtaposed such that light emitted by light source 110 falls directly onto spatial light modulator 112.

Display 100 comprises a display controller 120. Display controller 120 receives input image data signal 130. Display controller 120 comprises a timing controller 122 and a spatial light modulator (SLM) driver 124. SLM driver 124 generates output SLM driving signal 132 based on image data in input image data signal 130. Timing controller 122 controls the timing of SLM driver 124, and by extension the timing of SLM driving signal 132. In some embodiments timing controller 122 extracts and/or recovers timing information from input image data signal 130.

SLM driving signal 132 drives pixels (not shown) of spatial light modulator 112. Driving signal 132 determines what proportion of electromagnetic radiation (e.g., light) incident on pixels of SLM 112 from light source 110 is transmitted (passed through or reflected) to a viewing area. SLM driver 124 may be configured to generate driving signal 132 to cause pixels of SLM 112 to be updated according to a raster scan pattern, for example.

Display 100 comprises radiation sources 116A and 116B. Radiation sources 116A and 116B are operable to emit spectra of radiation which comprise one or more frequencies that are not included in the spectrum of electromagnetic radiation emitted by light source 110. Electromagnetic radiation emitted by radiation sources 116A and 116B may be outside the visible spectrum. For example, radiation sources 116A and 116B may emit electromagnetic radiation in the infrared or ultraviolet ranges. A synchronization signal emitted by radiation sources 116A and 116B may be imperceptible to the human visual system. Radiation sources 116A and 116B may be located in optical path 114 (as shown), or may be located out of optical path 114 (e.g., on the side of light source 110 opposite SLM 112, transversely adjacent optical path 114, etc.).

In some embodiments, radiation sources 116A and 116B emit different spectra of radiation. In some such embodiments, sensor 26 and/or controller 28 may be configured to distinguish between radiation from sources 116A and 116B based on the detected presence and/or absence of particular frequencies included in the different spectra of sources 116A and 116B.

In some embodiments, radiation sources 116A and 116B emit substantially the same spectrum of radiation. In some such embodiments, sensor 26 and/or controller 28 may be configured to distinguish among three states (e.g., where a display system behaves according to State Table III) based upon the received power of radiation in the spectrum or part(s) thereof.

Radiation source 116A is arranged to project radiation onto a first-to-be-updated part 112A of SLM 112. In some embodiments, radiation source 116A is arranged to project radiation onto the pixel of SLM 112 that is updated first in a refresh of SLM 112. In some embodiments, area 112A is located in or at the top, left corner (as viewed by viewer V) of SLM 112.

Radiation source 116B is arranged to project radiation onto a last-to-be-updated part 112B of SLM 112 that is updated at or about the temporal end of a refresh of SLM 112. In some embodiments, radiation source 116B is arranged to project radiation onto the pixel of SLM 112 that is updated last in a refresh of SLM 112. In some embodiments, area 112B is located in or at the bottom, right corner (as viewed by viewer V) of SLM 112.

Radiation sources 116A and 116B may arranged to project radiation onto different single pixels, single subpixels, groups of pixels or groups of subpixels of SLM 112. Display 100 may comprise optical elements (e.g., light guides, optical fibers, collimators and/or the like) configured to channel electromagnetic radiation from radiation sources 116A and 116B onto particular areas (e.g., pixels or subpixels, and/or groups thereof) of SLM 112.

In some embodiments, display 100 comprises one or more optical elements that couple electromagnetic radiation from one or both of radiation sources 116A and 116B onto corresponding areas of SLM 112 and exclude light from light source 110 from these corresponding areas of SLM 112. In such embodiments where electromagnetic radiation from sources 116A and 116B is not perceptible by the human visual system, the areas of SLM 112 corresponding to radiation sources 116A and/or 116B will appear dark to a viewer regardless of how the pixels and/or subpixels of SLM 112 in the corresponding areas are controlled.

Display controller 120 is configured to control SLM 112 to selectively transmit electromagnetic radiation emitted from radiation sources 116A and 116B to a viewing area (e.g., where a viewer V may be located) in accordance with method 30. For example, display controller 120 may be configured to control the pixels of SLM 112 according to State Table I above, wherein first emitter 18A comprises one or more first pixels on which electromagnetic radiation from radiation source 116A is incident, second emitter 18B comprises one or more second pixels on which electromagnetic radiation from radiation source 116B is incident, and the first and second pixels are controlled so that in the first signal state electromagnetic radiation from the corresponding electromagnetic radiation source 116A or 116B does not reach the viewing area (e.g., in the first signal state the pixels are controlled to block or reflect electromagnetic radiation away from the viewing area) and so that in the second signal state electromagnetic radiation from the corresponding electromagnetic radiation source 116A or 116B does reach the viewing area (e.g., in the second signal state pixels are controlled to pass or reflect electromagnetic radiation toward the viewing area).

It will be appreciated that when SLM 112 is so controlled:

electromagnetic radiation from radiation source 116A will begin to be emitted via SLM 112 at or about the temporal start of refreshes of SLM 112 to display images 72R intended for the right eye;

electromagnetic radiation from radiation source 116B will begin to be emitted via SLM 112 at or about the temporal end of refreshes of SLM 112 to display images 72R intended for the right eye;

electromagnetic radiation from radiation source 116A will cease being emitted via SLM 112 at or about the temporal start of refreshes of SLM 112 to display images 72L intended for the left eye;

electromagnetic radiation from radiation source 116A will cease being emitted via SLM 112 at or about the temporal end of refreshes of SLM 112 to display images 72L intended for the left eye; and glasses 22 may detect changes in the electromagnetic radiation and synchronize to the displayed images 72R and 72L based on the detected changes.

It will also be appreciated that when SLM 112 is so controlled, transmission of synchronization signals from sources 116A and 116B is controlled:

by means of the driving signals (e.g., SLM driving signal 132) for first-to-be-updated and last-to-be-updated parts of SLM 112 (e.g., pixels of SLM 112);

by way of first-to-be-updated and last-to-be-updated parts of SLM 112 (e.g., pixels of SLM 112); and by means of the driving signals (e.g., SLM driving signal 132) applied during first and last portions of the sequence according to which pixels of SLM 112 are updated.

It will further be appreciated that because pixels of SLM 112 control the transmission of electromagnetic radiation from sources 116A and 116B to viewer V, transmission of electromagnetic radiation from sources 116A and 116B is controlled by elements of the same construction as light emitting elements of display 100 (e.g, pixels of SLM 112). And since the transmission of electromagnetic radiation from sources 116A and 116B is by way of by pixels of SLM 112 that, respectively, are (or are near to) the first and last pixels updated, the timing of transmission of electromagnetic radiation from sources 116A and 116B implicitly accounts for, at least approximately, the response characteristics of SLM 112. Accordingly, transmission of electromagnetic radiation from radiation source 116B implicitly indicates that the pixels of display 100 have attained a stable optical state that forms an image.

It will be appreciated that display controller 120 may be configured to control the pixels of SLM 112 according to state tables other than State Table I, such as State Table II, State Table III, or the like, for example.

In some embodiments, display 100 comprises supplementary signaling means 136 for indicating display refreshes. Supplementary signaling means 136 may be configured to emit radio spectrum signals, microwave spectrum signals, infrared spectrum signals, or the like. In some embodiments, supplementary signaling means 136 are configured to communicate signals using a wireless communications protocol (e.g., IEEE 802.11, Bluetooth, UltraWideBand, etc.). As can be appreciated from FIG. 3, supplementary signaling means 136 may be controlled based on the timing used to initiate refreshes of SLM 112 (e.g., based on timing information provided by timing controller 122). However, since the signals emitted by supplementary signaling means 136 are not controlled by means of the signals that drive SLM 112 or by way of SLM 112, the timing of signals emitted by supplementary signaling means 136 does not account for the response characteristics of SLM 112 or the timing by which elements of SLM 112 are updated. In some embodiments, supplementary signaling means 136 are used in place of at least one of the at least two emitters (e.g., to signal the start of display refreshes in place of emitter 18A and/or radiation source 116A).

In some embodiments, image data provided to SLM driver 124 causes SLM driver 124 to generate SLM driving signal 132 to control SLM 112 to selectively transmit electromagnetic radiation emitted from radiation sources 116A and/or 116B (e.g., in accordance with method 30). For example, display controller 120 may comprise an image data processor 126 configured to modify image data signal 130 to produce a modified image data signal 130A that when provided to SLM driver 124 causes SLM driver 124 to control parts 112A and/or 112B of SLM 112 to selectively transmit electromagnetic radiation emitted from radiation sources 116A and/or 116B (e.g., in accordance with method 30). Image processor 126 may be located upstream of SLM driver 124 or integrated with SLM driver 124. In some embodiments, display controller 120 is provided with image data 130 formed to control 112A and/or 112B of SLM 112 to selectively transmit electromagnetic radiation emitted from radiation sources 116A and/or 116B (e.g., in accordance with method 30).

Figure 4:
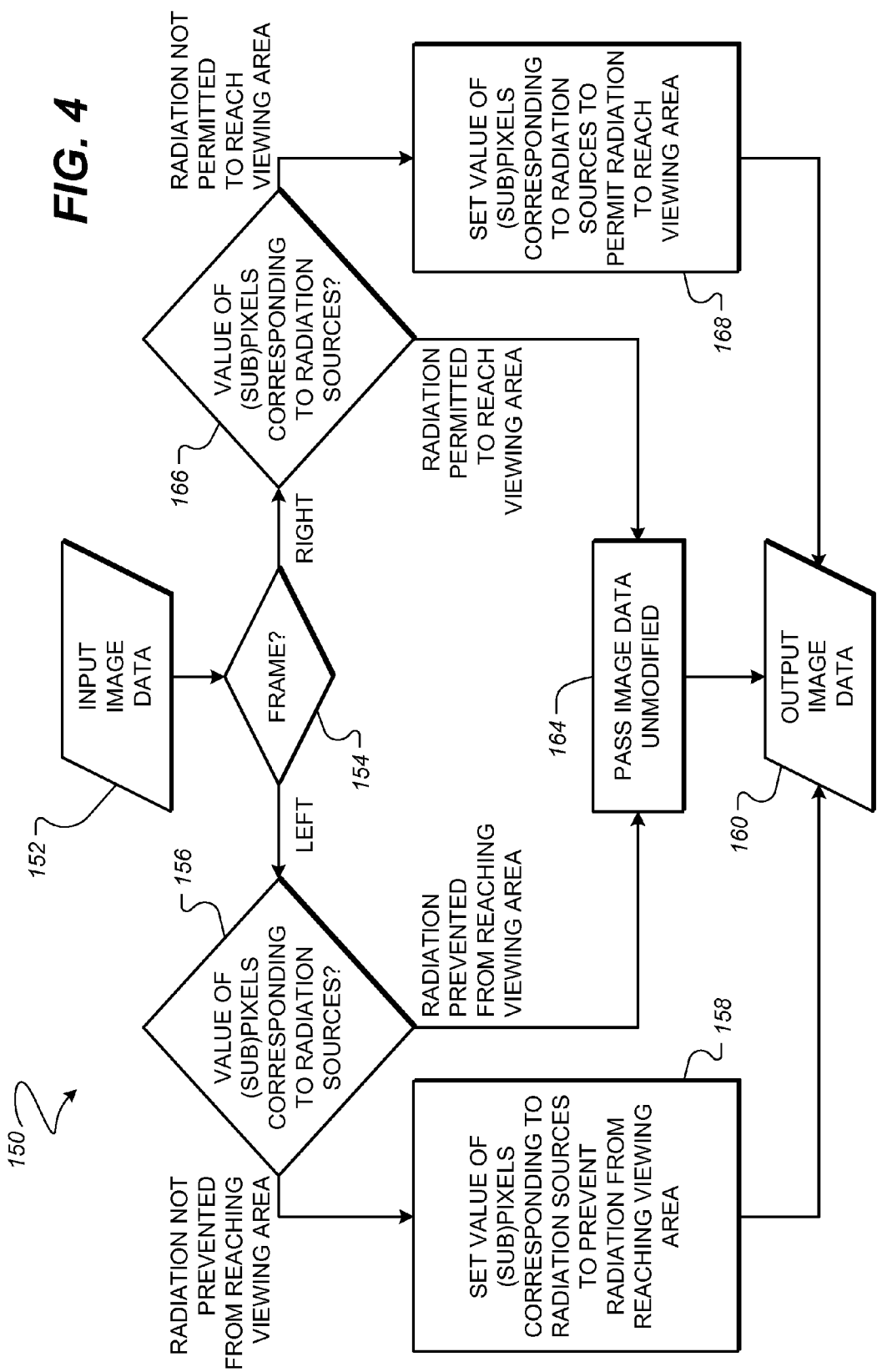
FIG. 4 is a flowchart of a method according to an example embodiment for modifying values of image data pixels to control a spatial light modulator.

FIG. 4 is a flowchart of a method 150 according to an example embodiment for modifying values of image data pixels to control SLM 112 for selectively transmitting electromagnetic radiation from radiation sources 116A and 116B to a viewing area. Method 150 may be applied to input image data to produce output image data that drives an SLM to selectively emit radiation from radiation sources according to method 30. It will be appreciated that method 150 may be modified to produce output image data that drives an SLM to selectively emit radiation from radiation sources according to other method embodiments (e.g., embodiments that behave according to State Table II or State Table III). Display controller 120 and/or image data processor 126 may be configured to implement all or part of method 150. In some embodiments, method 150 may be implemented, in whole or in part, by another component located upstream of SLM driver 124 (e.g., a component located upstream of display 100).

In method 150, image data 152 comprises frames, which in turn comprise pixels. In step 154, it is determined whether a frame of image data 152 specifies a left eye image or a right eye image. If the frame specifies a left eye image, method 150 proceeds to step 156. If the frame specifies a right eye image, method 150 proceeds to step 166.

In step 156, it is determined whether the values of the image data pixel(s) (and/or subpixel(s)) corresponding to the light emitting element(s) (e.g., pixel(s) and/or subpixel(s)) of SLM 112 which receive electromagnetic radiation from radiation sources 116A and 116B (e.g., light emitting elements in first-to-be-updated and last-to-be-updated parts of SLM 112) are set such that SLM 112 would, when driven according to these values, prevent electromagnetic radiation from radiation sources 116A and 116B from reaching the viewing area with intensity sufficient to be detected by sensor 26 of glasses 22. If SLM 112 when driven according to the image data values would prevent electromagnetic radiation from radiation sources 116A and 116B from reaching the viewing area with intensity sufficient to be detected by sensor 26 of glasses 22, then in step 164 input image data 152 is passed unmodified to output image data 160. If SLM 112 when driven according to the image data values would permit electromagnetic radiation from radiation sources 116A and 116B to reach the viewing area with intensity sufficient to be detected by sensor 26 of glasses 22, then in step 158 the image data values are modified so that SLM 112 when driven according to the modified image data values in output image data 160 will prevent electromagnetic radiation from radiation sources 116A and 116B from reaching the viewing area with intensity sufficient to be detected by sensor 26 of glasses 22.

In step 166, it is determined whether the values of the image data pixel(s) (and/or subpixel(s)) corresponding to the light emitting element(s) (e.g., pixel(s) and/or subpixel(s)) of SLM 112 which receive electromagnetic radiation from radiation sources 116A and 116B are set such that SLM 112 would, when driven according to these values, permit electromagnetic radiation from radiation sources 116A and 116B to reach the viewing area with intensity sufficient to be detected by sensor 26 of glasses 22. If SLM 112 when driven according to the image data values would permit electromagnetic radiation from radiation sources 116A and 116B to reach the viewing area, then in step 164 input image data 152 is passed unmodified to output image data 160. If SLM 112 when driven according to the image data values would prevent electromagnetic radiation from radiation sources 116A and 116B from reaching the viewing area with intensity sufficient to be detected by sensor 26 of glasses 22, then in step 168 the image data values are modified so that SLM 112 when driven according to the modified image data values in output image data 160 will permit electromagnetic radiation from radiation sources 116A and 116B to reach the viewing area with intensity sufficient to be detected by sensor 26 of glasses 22.

In embodiments where modified image data 130A is provided to SLM driver 124 for controlling SLM 112 to implement emitter signaling for controlling shutter glasses 22 (e.g., according to method 30), modified image data 130A may differ from image data 130. As a result, images displayed on display 100 when SLM 112 is controlled based on modified image data 130A may appear differently than if SLM 112 were controlled based on image data 130. In some embodiments, light source 110 of display 100 is controlled based on a light source driving signal 134 (e.g., light source 110 may comprise a dimming light modulator, a color light modulator, etc.), and display controller 120 comprises a light source driver 128 that generates light source driving signal 134 based on image data 130. In some embodiments, image data 130 is provided to light source driver 126 while modified image data 130A is provided to SLM driver 124. As compared with generating light source driving signal 134 based on modified image data 130A, generating light source driving signal 134 based on image data 130 may have less impact on the appearance of images on display 100.

Where emitters used to signal timing information for shutters 24R and 24L of glasses 22 comprise light emitting elements of a display, and light in the visible spectrum (e.g., from light source 110) is permitted to illuminate these elements, the control of these elements may affect the appearance of the image displayed by the display. In some embodiments, the effects on image appearance of controlling light emitting elements to signal timing information may be reduced by controlling light emitting elements that affect only a portion of the visible spectrum of light emitted by the display.

Figure 5:
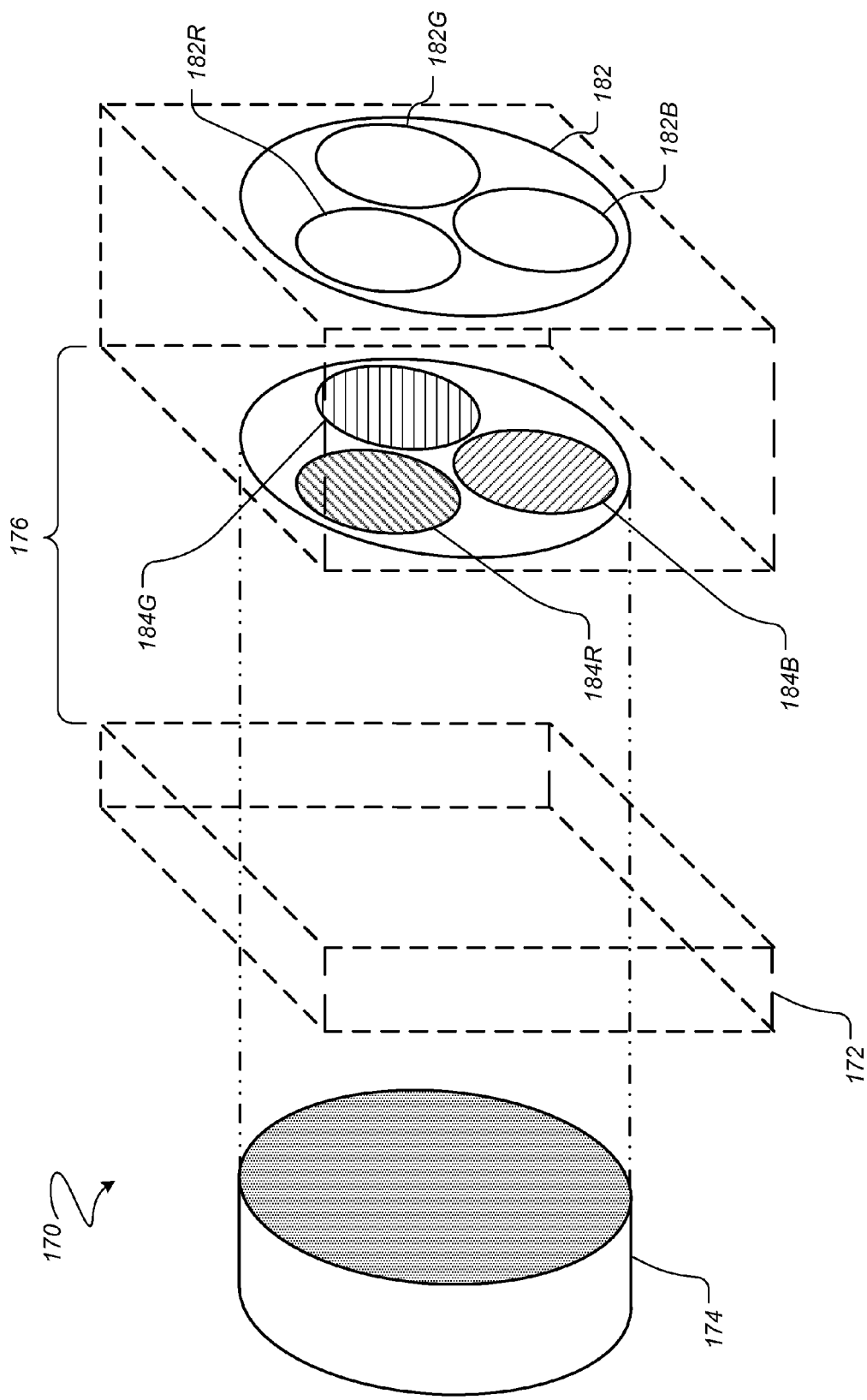
FIG. 5 is a perspective schematic view of a pixel of a display according to an example embodiment.

FIG. 5 is a perspective schematic view of a pixel 182 of a display 170 according to an example embodiment. Display 170 is a color display that comprises a color SLM 180 arranged to receive light from a light source 172. Pixel 182 may comprise a pixel that is updated at or about the temporal start of a refresh of SLM 180 (e.g., pixel 182 may be the first updated pixel when SLM 180 is refreshed) or may comprise a pixel that is updated at or about the temporal end of a refresh of SLM 180 (e.g., pixel 182 may be the last-updated pixel when SLM 180 is refreshed).

Pixel 182 of SLM 180 comprises a set of subpixels 182R, 182G and 182B. Subpixels 182R, 182G and 182B are operable to selectively block or pass electromagnetic radiation. Subpixels 182R, 182G and 182B may pass electromagnetic radiation by being fully transmissive or less than fully transmissive of incident light, for example. Each subpixel 182R, 182G and 182B has a corresponding color filter; respectively, 184R, 184G and 184B. The spectral composition of electromagnetic radiation emitted from each of subpixels 182R, 182G and 182B depends on both the spectral composition of the light emitted by light source 172 and the properties of the corresponding filter 184R, 184G or 184B.

An infrared electromagnetic radiation source 174 is arranged to project infrared electromagnetic radiation onto filters 184R, 184G and 184B. In the illustrated embodiments, source 174 is located on the side of light source 172 opposite to SLM 180. In other embodiments, source 174 may be interposed between light source 172 and SLM 180 or located transversely adjacent to optical path 176. Display 170 and/or electromagnetic radiation source 174 may be configured so that source 174 does not project electromagnetic radiation onto pixels of SLM 180 other than pixel 182. For example display 170 may comprise one or more optical elements (e.g., collimators, light guides, or the like) to channel electromagnetic radiation from source 174 onto pixel 182 and/or subpixel filter 184R.

Figure 6:
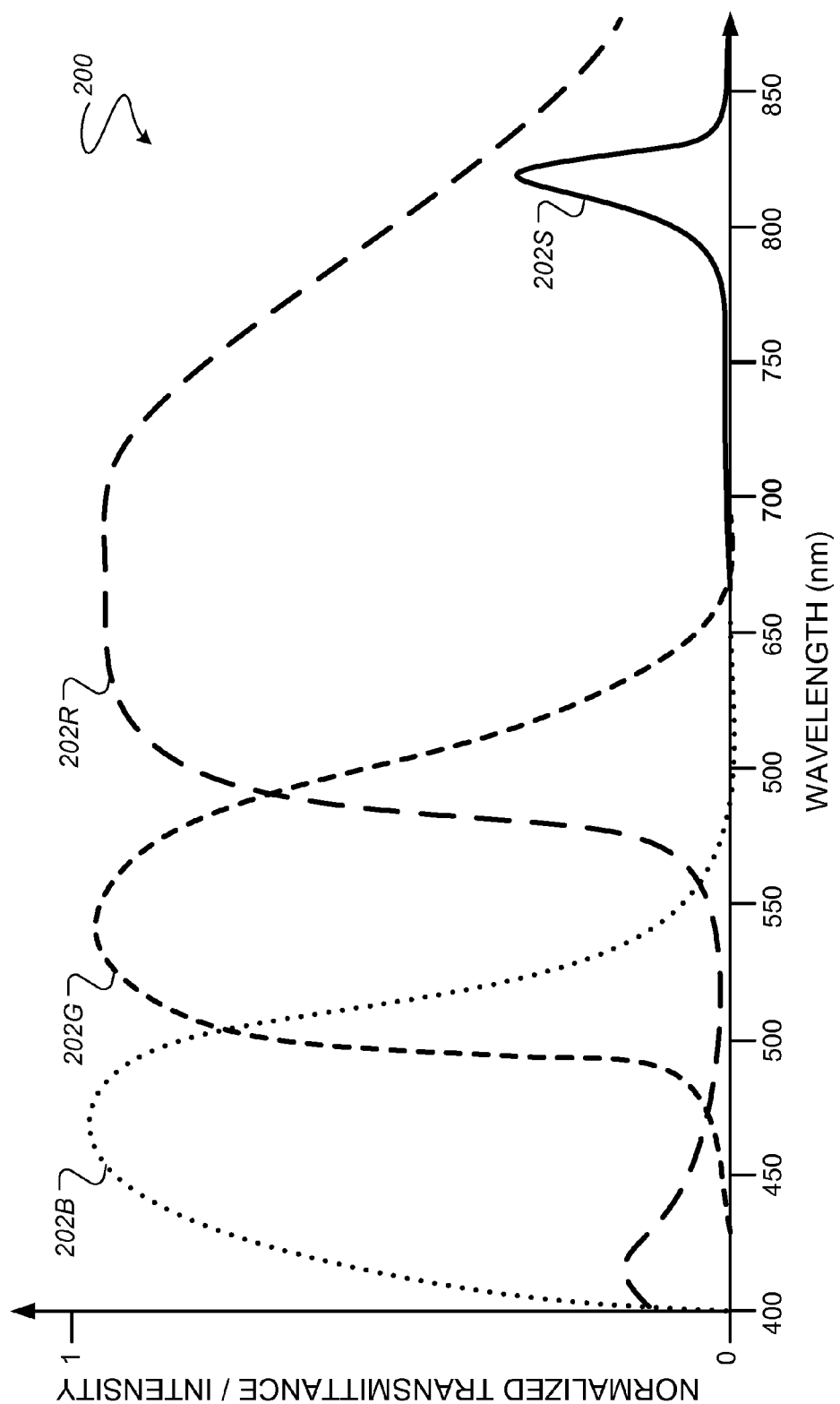
FIG. 6 is a graph of electromagnetic radiation spectra.

FIG. 6 shows a graph 200 of electromagnetic radiation spectra. In graph 200, line 202B represents the spectrum of electromagnetic radiation passed by filter 184B, line 202G represents the spectrum of electromagnetic radiation passed by filter 184G, and line 202R represents the spectrum of electromagnetic radiation passed by filter 184R. Line 202S represents the spectrum of electromagnetic radiation emitted by electromagnetic radiation source 174. It will be appreciated that only filter 184R passes electromagnetic radiation emitted by source 174. That is, filter 184R is configured to pass electromagnetic radiation from radiation source 174, while filters 184B and 184G are configured to block electromagnetic radiation from radiation source 174.

Method 150 may be implemented for use in conjunction with display 170 as follows. In step 156, it is determined whether the image data value corresponding to subpixel 182R is less than a first threshold value. The first threshold value may be selected such that when subpixel 182R is driven according to the first threshold value, subpixel 182R prevents electromagnetic radiation from source 174 from reaching the viewing area with intensity sufficient to be detected by sensor 26 of glasses 22. That is, when subpixel 182R is driven according to a value less than or equal to the first threshold value, sensor 26 will fail to detect electromagnetic radiation from source 174. If the image data value corresponding to subpixel 182R is less than or equal to the first threshold value, then in step 154 input image data 152 is passed unmodified to output image data 160. If the image data value corresponding to subpixel 182R is greater than the first threshold value, then in step 158 the image data value corresponding to subpixel 182R is modified to be less than or equal to the first threshold value.

In step 166, it is determined whether the values of the image data value corresponding to subpixel 182R is greater than a second threshold value. The second threshold value may be selected such that when subpixel 182R is driven according to the second threshold value, subpixel 182R permits electromagnetic radiation from source 174 to reach the viewing area with intensity sufficient to be detected by sensor 26 of glasses 22. That is, when subpixel 182R is driven according to a value greater than or equal to the second threshold value, sensor 26 will detect electromagnetic radiation from source 174. If the image data value corresponding to subpixel 182R is greater than or equal to the second threshold value, then in step 154 input image data 152 is passed unmodified to output image data 160. If the image data value corresponding to subpixel 182R is less than the second threshold value, then in step 158 the image data value corresponding to subpixel 182R is modified to be greater than or equal to the second threshold value.

It will be appreciated that refresh timing information may be signaled by light emitting elements that affect only a portion of the visible spectrum in displays were filters of two or more subpixels do not sufficiently block electromagnetic radiation from radiation source 174. For example, electromagnetic radiation from radiation source 174 may be channeled by one or more optical elements to only subpixel(s) corresponding to a particular portion of the visible spectrum. For example, radiation source 174 may be configured to emit its electromagnetic radiation into a light guide that channels the electromagnetic radiation to subpixel 182R, such that substantially no electromagnetic radiation from radiation source 174 reaches subpixels 182B and 182G.

During use of glasses 22, it may occur that the reception by sensor 26 of emissions from emitters 18A and 18B is disrupted. For example, viewer V may momentarily cover sensor 26 with her hand (such as to adjust the position of glasses 22) or turn her head so that sensor 26 does not face display 12. In order to maintain synchronization of shutters 24L and 24R with the images displayed on display 12 during disruptions in the reception by sensor 26 of emissions from emitters 18A and 18B, glasses 22 may be configured to control shutters 24L and 24R based on the timing of emissions previously detected by sensor 26 (e.g., in "freewheel" manner). In some embodiments, a controller of glasses 22 is configured to generate a synthetic emitter state signal based on the timing of emissions previously detected by sensor 26, and control of shutters 24L and 24R is based on the synthetic emitter state signal.

FIG. 7A is a block diagram of an example system 210 for generating a synthetic emitter state signal based on the timing of emissions previously detected by sensor 26. Controller 28 of glasses 22 may comprise system 210. In system 210, a frequency reference 212 provides a frequency reference signal 214 at half of a pre-determined refresh frequency of the display (not shown) to a phase offset detector 216. Frequency reference 212 may be pre-configured to provide frequency reference signal 214 at half of a pre-determined refresh frequency of the display (e.g., where glasses 22 are provided as an accessory to display 12) or may be user configurable to provide an appropriate frequency reference signal 214.

A sensor 218 provides an detected emitter state signal 220 indicative of the emitter state to phase offset detector 216. Phase offset detector 216 generates a phase offset signal 222 indicative of the phase offsets between the most recent tracked edge of a frequency reference signal 214 and the following rising and trailing edges of a detected emitter state signal 220. Sensor 218 and/or phase offset detector 216 may be configured to debounce detected emitter state signal 220. Phase offset signal 222 is provided to a control synthesizer block 224. Control synthesizer block 224 generates a synthetic emitter state signal 226 that lags the most recent tracked edge of the frequency reference by the last valid phase offset determined by phase offset detector 216.

FIG. 7B is a flowchart of a method 230 for generating a synthetic emitter state signal based on the timing of emissions previously detected by sensor 26. Method 230 may be implemented in controller 28 of glasses 22. Step 232 is triggered by tracked edges of frequency reference signal 214. In step 232 the phase offsets between the tracked edge of frequency reference signal 214 and the following rising and falling edges of detected emitter state signal 220 are determined. In step 234 it is determined whether the phase offsets determined in step 232 are valid. Step 234 may comprise determining whether the phase offsets determined in step 232 are less than the period of frequency reference signal 214. If the phase offsets determined in step 232 is valid (step 234, YES), then the current phase offsets 240 are updated in step 236 and method 230 returns to step 232. If the phase offsets determined in step 232 are not valid (step 234, NO), then the current phase offsets 240 are not updated and method 230 returns to step 232.

Step 240 is triggered by tracked edges of frequency reference signal 214. In step 240, synthetic emitter state signal 226 is generated at the current phase offsets 238 from the tracked edges of the frequency reference signal 214.

FIG. 7C is a timing diagram of method 230 generating a synthetic emitter state signal 226 based on frequency reference signal 214 and detected emitter state signal 220. Rising edges R1, R2, R3 and R4 of frequency reference signal 214 occur at times T1, T2, T3 and T4, respectively. A change in detected emitter state signal 220 to detected first state signal DF1 (e.g., rising edge to logic high) is phase offset by time Δ1 from tracked edge R1 of frequency reference signal 214. A change in detected emitter state signal 220 to detected emitter second state signal DS1 (e.g., falling edge to logic low) is phase offset by time Δ2 from tracked edge R1 of frequency reference signal 214. Since phase offsets Δ1 and Δ2 are valid (e.g., because they are less than the period of frequency reference signal 214), they are used as the current phase offsets for generating synthetic emitter state signal 216 at the next tracked edge R2 of frequency reference signal 214. Accordingly, synthetic first state signal SF1 is offset from edge R2 by phase offset Δ1, and synthetic first state signal SS1 is offset from edge R2 by phase offset Δ2.

A change in detected emitter state signal 220 to detected first state signal DF2 (e.g., rising edge to logic high) is phase offset by time Δ3 from tracked edge R2 of frequency reference signal 214. A change in detected emitter state signal 220 to detected emitter second state signal DS2 (e.g., falling edge to logic low) is phase offset by time Δ4 from tracked edge R2 of frequency reference signal 214. Since phase offsets Δ3 and Δ4 are valid (e.g., because they are less than the period of frequency reference signal 214), they are used as the current phase offsets for generating synthetic emitter state signal 216 at the next tracked edge R3 of frequency reference signal 214. Accordingly, synthetic first state signal SF2 is offset from edge R3 by phase offset Δ3, and synthetic first state signal SS2 is offset from edge R3 by phase offset Δ4.

No changes in of detected emitter state signal 220 are detected after time T2+Δ2 (e.g., due to viewer V turning away from display 12). As a result, no valid phase offsets are determined after time T2+Δ2, and the current phase offset for generating synthetic emitter state signal 216 at the next tracked edge R4 is not changed. Accordingly, synthetic first state signal SF3 is offset from edge R4 by phase offset Δ3, and synthetic first state signal SS3 (not shown) is offset from edge R4 by phase offset Δ4.

It will be appreciated that other techniques may be used to generate synthetic emitter state signal 220. For example, synthetic emitter state signal 220 may be generated without frequency reference signal 214 based on inter-state signal timing, such as between consecutive first state signals (e.g., consecutive rising edges of emitter state signal 220), between consecutive second state signals (e.g., consecutive rising and falling edges of emitter state signal 220), or between consecutive first and second state signals (e.g., consecutive rising and falling edges of emitter state signal 220). Other techniques for generating synthetic emitter state signal 220 include using phase locked loops, and the like.

In a non-limiting specific example embodiment, a television has a LCD panel backlit by a backlight which emits visible light. A controller receives image data comprising left and right eye views for each of a series of frames and controls pixels of the LCD panel by way of suitable drive electronics to display images specified by image data. For each frame, the controller displays a left eye view image and a right eye view image. For each image the LCD panel modulates the visible light from the backlight according to the image. Between displaying each image the LCD panel is refreshed to display the next image.

An infrared light source is located to illuminate a portion of the LCD panel with infrared light. The controller is configured to control one or more pixels or subpixels in the portion of the of the LCD panel to control the amount of infrared light from the infrared light source that is transmitted through the LCD panel to the viewing location. The transmitted infrared light constitutes a synchronization signal. Control of the pixels or subpixels may be achieved by altering image data corresponding to those pixels or subpixels. Advantageously, this permits generation and control of the synchronization signal with minimal additional hardware (e.g., only the infrared light source, and, optionally, optical elements for channeling infrared light to and/or excluding visible light from the pixels or subpixels) and without modification of the standard driving electronics for the LCD panel. The pixels or subpixels may be located in a last-to-be refreshed part of the LCD panel such that changes in the synchronization signal occur when refresh of the LCD panel is essentially complete.

Shutter glasses worn by viewers contain sensors that detect the infrared synchronization signals. The shutter glasses may be configured to operate the shutters to allow viewing by the appropriate eye of a viewer in response to detection of the synchronization signal.

Another synchronization signal may be transmitted from the display to signal the start of a refresh of the LCD panel. The shutter glasses may be configured to operate the shutters to block light to both of the viewer's eyes in response to the other synchronization signal. The other synchronization signal may be delivered by way of the LCD panel or via some other mechanism. For example, another infrared light source may be located to illuminate another portion of the LCD panel with infrared light. The controller is configured to control one or more pixels or subpixels in the other portion of the of the LCD panel to control the amount of infrared light from the other infrared light source that is transmitted through the LCD panel to the viewing location. This transmitted infrared light constitutes the other synchronization signal. The pixels or subpixels in the other portion of the LCD panel may be located in a first-to-be refreshed part of the LCD panel such that changes in the synchronization signal occur when refresh of the LCD panel is starting.

Some embodiments comprise features not ascribed to embodiments described herein and/or features different from those ascribed to embodiments described herein. For example;

In some embodiments, signals emitted by emitters 18A and 18B are transients signals. For example, signal 51 may comprise a first temporal pattern of emissions of electromagnetic radiation of a first frequency, signal 52 may comprise a second temporal pattern of emissions of electromagnetic radiation of a second frequency, signal 61 may comprise a first temporal pattern of emissions of electromagnetic radiation of a second frequency different from the first frequency, and signal 62 may comprise a second temporal pattern of emissions of electromagnetic radiation of a second frequency. In some embodiments, controller 28 of glasses 22 may be configured to recognize in signals from sensor 26 temporal patterns corresponding to the signal emitted by emitters 18A and 18B. In some embodiments, controller 28 of glasses 22 may be configured to implement a state machine that transitions between states in response to detected transient signals of emitters 18A and 18B, and left and right shutters 24L and 24R are controlled based on the current state of the state machine.

In some embodiments, sensor 26 and/or a controller of glasses 22 is configured to register changes in signals emitted by emitters 18A and 18B only when the levels of detected signals from emitters 18A and 18B have settled (e.g., are non-oscillating).

In some embodiments, only signals indicative of the end of refresh intervals (e.g., signals from emitter 18B) are transmitted by way of light emitting elements of the display. In some such embodiments, supplementary refresh signaling means may be used to indicate the start of refresh intervals.

In some embodiments, a plurality of light emitting elements may be controlled in turn to selectively transmit a refresh signal so as to reduce the visual impact of controlling the light emitting elements to provide refresh signaling. As an illustrative example, consider a case where eight, last-to-be-updated pixels of an SLM are adjacent one another. If image data specifies that all eight of the pixels are to have a state which is substantially non-emitting of light, refresh signaling which requires transmission of synchronization signaling radiation may be implemented by controlling a different one of the pixels to transmit synchronization signaling radiation in each of eight successive frames. As a result, a different one of the eight last-to-be-updated pixels transmits visible light in each of eight successive frames.

In some embodiments, one or more of a plurality of light emitting elements may be controlled to selectively transmit synchronization signaling radiation based on the image data for the plurality of light emitting elements. For example, where image data for at least one of a plurality of light emitting elements is consonant with the required transmission of synchronization signaling radiation, the image data may be provided to the light emitting elements unchanged, but where image data for none of the plurality of light emitting elements is consonant with the required transmission of synchronization signaling radiation, the image data for at least one of the plurality of light emitting elements may be modified to provide the required transmission. The at least one of the plurality of light emitting elements modified to provide the required transmission may be selected to minimize perceptible impact on the display image.

It will be appreciated that some embodiments provide several advantages, including one or more of the following:

Synchronization signals transmitted by way of light emitting elements may be implemented with the addition of only a single additional radiation source whose emissions can be selectively transmitted by an existing lighting element of the display. For example, a single radiation source that emits radiation of a spectrum distinct from the spectrum (or spectra) of light emitted by the display may be installed in project radiation onto select pixels of an SLM, which pixels can then be controlled to selectively transmit radiation from the source (e.g., in accordance with method 30).

Synchronization signals transmitted by way of light emitting elements may be implemented without significant display redesign (e.g., without modifications to the light emitting elements, the display controller, etc.). For example, control of light emitting elements for refresh signaling may be implemented by modifying image data upstream of an existing SLM driver. For another example, control of light emitting elements for refresh signaling may be implemented by modifying the display controller or components thereof (e.g., a SLM driver) to toggle one or more pixels with each left and right image frame without regard to image data.

Systems, modules and components described herein may comprise software, firmware, hardware, or any combination(s) of software, firmware, or hardware suitable for the purposes described herein. Software and other modules may reside on personal computers, video projectors, shutter glasses, displays (such as televisions, computer monitors, and the like) and other devices suitable for the purposes described herein. Furthermore, aspects of the system can be embodied in a special purpose computer or data processor that is specifically programmed, configured, or constructed to perform one or more of the computer-executable instructions explained in detail herein.

Image processing and processing steps as described above may be performed in hardware, software or suitable combinations of hardware and software. For example, such image processing may be performed by a data processor (such as one or more microprocessors, graphics processors, digital signal processors or the like) executing software and/or firmware instructions which cause the data processor to implement methods as described herein. Such methods may also be performed by logic circuits which may be hard configured or configurable (such as, for example logic circuits provided by a field-programmable gate array "FPGA").

Certain implementations of the invention comprise computer processors which execute software instructions which cause the processors to perform a method of the invention. For example, one or more processors in a television or other display, personal computer, set top box, display, video projector, shutter glasses, or the like may implement methods as described herein by executing software instructions in a program memory accessible to the processors.

Some aspects of the invention may also be provided in the form of a program product. The program product may comprise any non-transitory medium which carries a set of computer-readable signals comprising instructions which, when executed by a data processor, cause the data processor to execute a method of the invention. For example, such a program product may comprise instructions which cause a data processor in a display to modify image data to control transmission of a synchronization signal to a shutter assembly. Program products according to the invention may be in any of a wide variety of forms. The program product may comprise, for example, media such as magnetic data storage media including floppy diskettes, hard disk drives, optical data storage media including CD ROMs, DVDs, electronic data storage media including ROMs, flash RAM, hardwired or preprogrammed chips (e.g., EEPROM semiconductor chips), nanotechnology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Where a component (e.g. a controller, display, light source, spatial light modulator, radiation source, software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, functional, logical, or a combination thereof. Additionally, the words "herein," and words of similar import, when used in this application, shall refer to this application as a whole and not to any particular portions of this application. It will be appreciated that the words "left" and "right" used herein may be switched in uniform fashion. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various examples described above can be combined to provide further examples. Aspects of the system can be modified, if necessary, to employ the systems, functions, and concepts of the various references described above to provide yet further examples of the technology.

These and other changes can be made to the system in light of the above Detailed Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly and restrictively defines such terms. Accordingly, the actual scope of the system encompasses not only the disclosed examples, but also all equivalent ways of practicing or implementing the technology under the claims.

From the foregoing, it will be appreciated that specific examples of systems and methods have been described herein for purposes of illustration, but that various modifications, alterations, additions and permutations may be made without deviating from the spirit and scope of the invention. The embodiments described herein are only examples. Those skilled in the art will appreciate that certain features of embodiments described herein may be used in combination with features of other embodiments described herein, and that embodiments described herein may be practiced or implemented without all of the features ascribed to them herein. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for generating a signal to synchronize 3D glasses comprising:
   at a display, driving a spatial light modulator illuminated by a light source to display a sequence of images, the images comprising left images and right images;
   between display of left and right images, refreshing the spatial light modulator, the refreshing comprising, in a sequence, changing driving signals for a plurality of parts of the spatial light modulator starting with a first-to-be-updated part and completing with a last-to-be-updated part; and
   controlling transmission of a synchronization signal at least in part by the driving signals for the last-to-be-updated part;
   wherein:
   controlling transmission of the synchronization signal comprises setting the synchronization signal to a first state having a first electromagnetic radiation level to control a left shutter of the 3D glasses to be open;
   controlling transmission of the synchronization signal comprises setting the synchronization signal to a second state having a second electromagnetic radiation level to control a right shutter of the 3D glasses to be open;
   controlling transmission of the synchronization signal comprises setting the synchronization signal to a third state to control the right shutter and the left shutter of the 3D glasses to be open;
   wherein the first electromagnetic radiation includes a frequency not included in the second electromagnetic radiation;
   wherein:
   the display comprises one or more radiation sources operable to emit spectra of radiation which comprise one or more frequencies that are not included in a spectrum of electromagnetic radiation emitted by the light source; and
   the synchronization signal comprises electromagnetic radiation from the one or more radiation sources and the synchronization signal is at a frequency not included in the spectrum of light over which the left and right images are displayed.

2. The method of claim 1 comprising transmitting the synchronization signal by way of the last-to-be-updated part of the spatial light modulator.

3. The method of claim 2 wherein the last-to-be-updated part of the spatial light modulator comprises a last-to-be-updated pixel of the spatial light modulator.

4. The method of claim 1 wherein the synchronization signal is imperceptible to the human visual system.

5. The method of claim 1 wherein the synchronization signal comprises electromagnetic radiation in the infrared spectrum.

6. A method for generating a signal to synchronize 3D glasses comprising:
   in refreshing a display to display a new image, applying updated driving signals to light emitting elements of the display according to a sequence having a first portion and a last portion; and
   controlling transmission of a synchronization signal at least in part by the updated driving signals applied in the last portion of the sequence,
   controlling transmission of the synchronization signal comprises setting the synchronization signal to a first state having a first electromagnetic radiation level to control a left shutter of the 3D glasses to be open;
   controlling transmission of the synchronization signal comprises setting the synchronization signal to a second state having a second electromagnetic radiation level to control a right shutter of the 3D glasses to be open;
   controlling transmission of the synchronization signal comprises setting the synchronization signal to a third state to control the right shutter and the left shutter of the 3D glasses to be open;
   wherein the first electromagnetic radiation includes a frequency not included in the second electromagnetic radiation;
   wherein:
   the display comprises one or more light sources which supply light to the light emitting elements and one or more radiation sources separate from the light sources,
   the one or more radiation sources are operable to emit spectra of radiation which comprise one or more frequencies that are not included in a spectrum of electromagnetic radiation emitted by the light sources; and
   the updated driving signals control transmission of electromagnetic radiation from the radiation sources.

7. The method of claim 6 wherein controlling transmission of the synchronization signal comprises changing the amount of the electromagnetic radiation emitted by at least one light emitting element in a last-to-be-updated part of the display.

8. The method of claim 7 wherein the at least one light emitting element in the last-to-be-updated part of the display comprises a spatial light modulator pixel.

9. The method of claim 6 wherein the synchronization signal comprises electromagnetic radiation at a frequency not included in the spectrum of light over which the left and right images are displayed.

10. The method of claim 6 wherein the electromagnetic radiation is imperceptible to the human visual system.

11. The method of claim 10 wherein the synchronization signal comprises electromagnetic radiation in the infrared spectrum.

12. A 3D display comprising:
a spatial light modulator;
a light source configured to illuminate the spatial light modulator from a first side;
a display controller configured to:
in refreshing the display to display a new image, apply updated driving signals to pixels of the spatial light modulator according to a sequence having a first portion and a last portion;
controlling transmission of a synchronization signal at least in part by the updated driving signals for the last-to-be-updated part;
wherein:
controlling transmission of the synchronization signal comprises setting the synchronization signal to a first state having a first electromagnetic radiation level to control a left shutter of the 3D glasses to be open;
controlling transmission of the synchronization signal comprises setting the synchronization signal to a second state having a second electromagnetic radiation level to control a right shutter of the 3D glasses to be open;
controlling transmission of the synchronization signal comprises setting the synchronization signal to a third state to control the right shutter and the left shutter of the 3D glasses to be open;
wherein the first electromagnetic radiation includes a frequency not included in the second electromagnetic radiation; and
a signal source configured to emit electromagnetic radiation onto a pixel from the first side, the pixel updated in the last portion of the sequence, the electromagnetic radiation emittable by the signal source distinct from the spectrum of light emittable by the light source onto the spatial light modulator;
wherein the display controller is configured to control the pixel while the signal source is emitting the electromagnetic radiation to thereby control the amount of the electromagnetic radiation from the signal source transmitted through the pixel to a viewing location according to a state signal for controlling shutter glasses.

13. The 3D display of claim 12 wherein the electromagnetic radiation emittable by the signal source is imperceptible to the human visual system.

14. The 3D display of claim 12 wherein the electromagnetic radiation emittable by the signal source comprises electromagnetic radiation in the infrared spectrum.

15. Shutter glasses comprising:
left and right shutters independently operable to selectively block visible light;
a sensor configured to detect a synchronization signal; and
a controller configured to:
in response to the sensor detecting the synchronization signal having a first electromagnetic radiation indicative of a first state, control the left shutter to be open;
in response to the sensor detecting the synchronization signal having a second electromagnetic radiation indicative of a second state, control the right shutter to be open; and
in response to the sensor detecting the synchronization signal indicative of a third state, control the left and right shutters to be open,
wherein the first electromagnetic radiation includes a frequency not included in the second electromagnetic radiation.

16. The shutter glasses of claim 15 wherein the synchronization signal includes electromagnetic radiation imperceptible to the human visual system.

17. The shutter glasses of claim 16 wherein the synchronization signal includes electromagnetic radiation in the infrared spectrum.

18. The 3D display of claim 12 wherein the signal source is a first signal source, the electromagnetic radiation is first electromagnetic radiation and the pixel is a first pixel and the display comprises a second signal source configured to emit second electromagnetic radiation onto a second pixel from the first side, the second pixel updated in the first portion of the sequence, the second electromagnetic radiation distinct from the spectrum of light emittable by the light source onto the spatial light modulator and distinct from the first electromagnetic radiation;
wherein the display controller is configured to control the second pixel while the second signal source is emitting the second electromagnetic radiation to thereby control the amount of the second electromagnetic radiation from the second signal source transmitted through the second pixel to the viewing location according to the state signal for controlling the shutter glasses.

19. The 3D display of claim 18 wherein the second pixel is in a top left corner of the spatial light modulator as viewed from the viewing area and the first pixel is in a bottom right corner of the spatial light modulator as viewed from the viewing area.

* * * * *